US012597390B2

(12) United States Patent
Son et al.

(10) Patent No.: US 12,597,390 B2
(45) Date of Patent: Apr. 7, 2026

(54) PIXEL, DISPLAY DEVICE AND ELECTRONIC DEVICE INCLUDING THE SAME

(71) Applicant: SAMSUNG DISPLAY CO., LTD., Yongin-si (KR)

(72) Inventors: Min Seong Son, Yongin-si (KR); Seung Kyu Lee, Yongin-si (KR); Do Yeong Kang, Yongin-si (KR); Hyeon Woong Kang, Yongin-si (KR); Jin Sung Choi, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/095,811

(22) Filed: Mar. 31, 2025

(65) Prior Publication Data

US 2025/0316233 A1 Oct. 9, 2025

(30) Foreign Application Priority Data

Apr. 9, 2024 (KR) ........................ 10-2024-0047937

(51) Int. Cl.
*G09G 3/3233* (2016.01)

(52) U.S. Cl.
CPC ..... *G09G 3/3233* (2013.01); *G09G 2300/043* (2013.01); *G09G 2300/0819* (2013.01); *G09G 2310/08* (2013.01); *G09G 2320/0233* (2013.01)

(58) Field of Classification Search
None
See application file for complete search history.

(56) References Cited

U.S. PATENT DOCUMENTS 11,393,399 B2 7/2022 Na
11,881,169 B2 1/2024 Kwon et al.

FOREIGN PATENT DOCUMENTS

KR 10-1622635 B1 5/2016
KR 10-2023-0056854 A 4/2023
KR 10-2536629 B1 5/2023
KR 10-2662925 B1 5/2024
WO 2011099784 A2 8/2011

*Primary Examiner* — Aneeta Yodichkas
(74) *Attorney, Agent, or Firm* — F. CHAU & ASSOCIATES, LLC

(57) ABSTRACT

A pixel including: a fifth transistor between a power voltage and a fourth node, and including a gate electrode connected to a first emission control line; a first transistor between the power voltage and a second node, and including a gate electrode connected to a first node; a second transistor between a data line and the first node, and including a gate electrode connected to a second scan line; a sixth transistor between the second node and a third node, and including a gate electrode connected to a second emission control line; a capacitor between the first node and the second node; and a light emitting element between the third node and a power voltage, in a non-emission period, the sixth transistor is turned off after the fifth transistor is turned off, and in an emission period, the sixth transistor is turned on after the fifth transistor is turned on.

19 Claims, 11 Drawing Sheets

PIXEL, DISPLAY DEVICE AND ELECTRONIC DEVICE INCLUDING THE SAME

CROSS-REFERENCE TO RELATED APPLICATION

This application claims priority under 35 U.S.C. § 119 to Korean Patent Application No. 10-2024-0047937 filed in the Korean Intellectual Property Office on Apr. 9, 2024, the disclosure of which is incorporated by reference herein in its entirety.

(A) TECHNICAL FIELD

The present disclosure relates to a pixel, a display device, and an electronic device including the same.

(B) DESCRIPTION OF THE RELATED ART

Recently, there has been a growing interest in information displays. As a result, continuous research and development efforts are being dedicated to improving display devices.

The display device includes a plurality of pixels connected to a data line and a scan line. Each pixel includes a pixel circuit and a light emitting element. The light emitting element emits light at a predetermined luminance in response to a driving current supplied by a driving transistor through the pixel circuit.

When the display device operates at high speed, the voltages at certain nodes within the pixel may become unstable. This instability can lead to a deterioration in pixel luminance in some frames.

SUMMARY

An embodiment of the present disclosure provides a pixel, a display device, and an electronic device including the same that can achieve stable target luminance, even during high speed operation.

An embodiment of the present disclosure provides a pixel including: a fifth transistor that is connected between a first power voltage and a fourth node, and includes a gate electrode connected to a first emission control line; a first transistor that is connected between the first power voltage and a second node, and includes a first gate electrode connected to a first node; a second transistor that is connected between a data line and the first node, and includes a gate electrode connected to a second scan line; a sixth transistor that is connected between the second node and a third node, and includes a gate electrode connected to a second emission control line; a first capacitor connected between the first node and the second node; and a light emitting element connected between the third node and a second power voltage, wherein when the pixel enters a non-emission period, the sixth transistor is turned off after the fifth transistor is turned off, and when the pixel enters an emission period, the sixth transistor is turned on after the fifth transistor is turned on.

The pixel further includes: a third transistor that is connected between a reference voltage and the first node, and includes a gate electrode connected to a third scan line; a fourth transistor that is connected between the second node and a first initialization voltage, and includes a gate electrode connected to a first scan line; a seventh transistor that is connected between the third node and a second initialization voltage, and includes a gate electrode connected to a fourth scan line; and a second capacitor connected between the reference voltage and the second node, wherein a second gate electrode of the first transistor is connected to the second node.

The first to seventh transistors are N-type transistors.

After the sixth transistor is turned off, a data writing operation using the first capacitor is performed, and after the data writing operation, the fourth transistor is turned on and the first initialization voltage is applied to the second node.

After the first initialization voltage is applied to the second node, the fourth transistor is turned off, and the fifth transistor is turned on, then the seventh transistor is turned off, and then the sixth transistor is turned on to enter the emission period.

When a driving time of a panel driving frame is a reference driving time, one display scan operation is performed, and when the driving time of the panel driving frame is not the reference driving time, one display scan operation and at least one or more self-scan operations are performed; during the display scan operation, after the sixth transistor is turned off, the fourth and seventh transistors are turned on and an initialization operation is performed; the third and fifth transistors are turned on and a threshold voltage compensation operation for the first transistor is performed; the second transistor is turned on and a writing operation using the first capacitor is performed; and after the writing operation is performed, the fourth transistor is turned on and the first initialization voltage is applied to the second node.

After the first initialization voltage is applied to the second node, the fifth transistor is turned on, then the seventh transistor is turned off, and then the sixth transistor is turned on to enter the emission period.

When a driving time of a panel driving frame is a reference driving time, one display scan operation is performed, and when the driving time of the panel driving frame is not the reference driving time, one display scan operation and at least one or more self-scan operations are performed; during the self-scan operation, after the sixth transistor is turned off, the second transistor is turned on and a writing operation using the first capacitor is performed; and after the writing operation is performed, the fourth transistor is turned on and the first initialization voltage is applied to the second node.

After the first initialization voltage is applied to the second node, the fifth transistor is turned on, then the seventh transistor is turned off, and then the sixth transistor is turned on to enter the emission period.

An embodiment of the present disclosure provides a display device including: a pixel that is connected to a data line, a plurality of emission control lines, and a plurality of scan lines; an emission driver that supplies at least one emission control signal to the plurality of emission control lines; a scan driver that supplies at least one initialization signal, a write signal, and a reset signal to the plurality of scan lines; a data driver that supplies a data voltage to the data line; and a power voltage generator that supplies a first power voltage, a second power voltage, a reference voltage, a first initialization voltage, and a second initialization voltage to the pixel, wherein the pixel includes: a fifth transistor that is connected between a first power voltage and a fourth node, and includes a gate electrode connected to a first emission control line; a first transistor that is connected between the first power voltage and a second node, and includes a first gate electrode connected to a first node; a second transistor that is connected between the data line and the first node, and includes a gate electrode connected to a second scan line; a sixth transistor that is connected between the second node and a third node, and includes a gate electrode connected to a second emission control line; a first capacitor connected between the first node and the second node; and a light emitting element connected between the third node and a second power voltage, and when the pixel enters a non-emission period, the sixth transistor is turned off after the fifth transistor is turned off, and when the pixel enters an emission period, the sixth transistor is turned on after the fifth transistor is turned on.

The pixel further includes: a third transistor that is connected between a reference voltage and the first node, and includes a gate electrode connected to a third scan line; a fourth transistor that is connected between the second node and a first initialization voltage, and includes a gate electrode connected to a first scan line; a seventh transistor that is connected between the third node and a second initialization voltage, and includes a gate electrode connected to a fourth scan line; and a second capacitor connected between the reference voltage and the second node, and a second gate electrode of the first transistor is connected to the second node.

The first to seventh transistors are N-type transistors.

After the sixth transistor is turned off, a data writing operation using the first capacitor is performed, and after the data writing operation, the fourth transistor is turned on and the first initialization voltage is applied to the second node.

After the first initialization voltage is applied to the second node, the fourth transistor is turned off, and the fifth transistor is turned on, then the seventh transistor is turned off, and then the sixth transistor is turned on to enter the emission period.

When a driving time of a panel driving frame is a reference driving time, one display scan operation is performed, and when the driving time of the panel driving frame is not the reference driving time, one display scan operation and at least one or more self-scan operations are performed; during the display scan operation, after the sixth transistor is turned off, the fourth and seventh transistors are turned on and an initialization operation of the pixel is performed; the third and fifth transistors are turned on and a threshold voltage compensation operation for the first transistor is performed; the second transistor is turned on and a writing operation using the first capacitor is performed; and after the writing operation is performed, the fourth transistor is turned on and the first initialization voltage is applied to the second node.

After the first initialization voltage is applied to the second node, the fifth transistor is turned on, then the seventh transistor is turned off, and then the sixth transistor is turned on to enter the emission period.

When a driving time of a panel driving frame is a reference driving time, one display scan operation is performed, and when the driving time of the panel driving frame is not the reference driving time, one display scan operation and at least one or more self-scan operations are performed; during the self-scan operation, after the sixth transistor is turned off, the second transistor is turned on and a writing operation using the first capacitor is performed; and after the writing operation is performed, the fourth transistor is turned on and the first initialization voltage is applied to the second node.

After the first initialization voltage is applied to the second node, the fifth transistor is turned on, then the seventh transistor is turned off, and then the sixth transistor is turned on to enter the emission period.

An embodiment of the present disclosure provides a pixel circuit including: a fifth transistor with its gate electrode connected to a first emission control line, and its source-drain path connected between a first power voltage supply and a fourth node; a first transistor with its gate electrode connected to a first node, and its source-drain path connected between the first power voltage supply and a second node; a second transistor with its gate electrode connected to a second scan line, and its source-drain path connected between a data line and the first node; a sixth transistor with its gate electrode connected to a second emission control line, and its source-drain path connected between the second node and a third node; a first capacitor connected between the first node and the second node; and a light-emitting element with its anode connected to the third node and its cathode connected to a second power voltage supply, wherein, during a non-emission period, the sixth transistor is turned off after the fifth transistor, and during an emission period, the sixth transistor is turned on after the fifth transistor.

Another embodiment provides an electronic device a processor to provide input image data, and a display device to display an image based on the input image data. The display device includes: a pixel that is connected to a data line, a plurality of emission control lines, and a plurality of scan lines; an emission driver that supplies at least one emission control signal to the plurality of emission control lines; a scan driver that supplies at least one initialization signal, a write signal, and a reset signal to the plurality of scan lines; a data driver that supplies a data voltage to the data line; and a power voltage generator that supplies a first power voltage, a second power voltage, a reference voltage, a first initialization voltage, and a second initialization voltage to the pixel, wherein the pixel includes: a fifth transistor that is connected between a first power voltage and a fourth node, and includes a gate electrode connected to a first emission control line; a first transistor that is connected between the first power voltage and a second node, and includes a first gate electrode connected to a first node; a second transistor that is connected between the data line and the first node, and includes a gate electrode connected to a second scan line; a sixth transistor that is connected between the second node and a third node, and includes a gate electrode connected to a second emission control line; a first capacitor connected between the first node and the second node; and a light emitting element connected between the third node and a second power voltage, and when the pixel enters a non-emission period, the sixth transistor is turned off after the fifth transistor is turned off, and when the pixel enters an emission period, the sixth transistor is turned on after the fifth transistor is turned on.

The pixel, the display device and the electronic device including the same according to the embodiments of the present disclosure can achieve a stable target luminance even during high speed operation.

DETAILED DESCRIPTION OF THE EMBODIMENTS

Since the present disclosure may be modified in various ways and take on different forms, the following sections will illustrate and describe specific embodiments in detail. However, this should not be construed as limiting the disclosure to these specific embodiments. The present disclosure encompasses all changes, equivalents, and substitutes within the spirit and scope of the invention.

Terms such as first, second, and the like are used solely to describe various elements, and should not be interpreted as limiting these elements. These terms are only used to differentiate one element from another. For example, a first element may be referred to as a second element, and similarly, a second element may be referred to as a first element. Singular forms are intended to include plural forms unless the context clearly indicates otherwise.

In the present application, it should be understood that terms like "include", "comprise", "have", or "configure" indicate that the presence of a feature, number, step, operation, element, part, or combination thereof as described in the specification. However, these terms do not exclude the possibility of the presence or addition of one or more other features, numbers, steps, operations, elements, parts, or combinations thereof.

Some embodiments are described in the accompanying drawings in terms of functional blocks, units, and/or modules. Those skilled in the art will understand that these blocks, units, and/or modules are physically implemented using logic circuits, discrete components, microprocessors, hard-wired circuits, memory elements, wire connections, and other electronic circuits. They can be created using semiconductor-based manufacturing techniques or other manufacturing methods. When blocks, units, and/or modules are implemented by microprocessors or similar hardware, they may be programmed and controlled by software to perform the various functions discussed herein and may optionally be driven by firmware and/or software. It is also contemplated that each block, unit, and/or module may be implemented by dedicated hardware, or as a combination of dedicated hardware to perform some functions and a processor (for example, one or more programmed microprocessors and associated circuitry) to perform other functions. In addition, each block, unit, and/or module of some embodiments may be physically separated into two or more interacting and discrete blocks, units, and/or modules. Further, the blocks, units, and/or modules of some embodiments may be physically combined into more complex blocks, units, and/or modules.

Hereinafter, a display device according to an embodiment of the present disclosure will be described with reference to the accompanying drawings.

Figure 1:
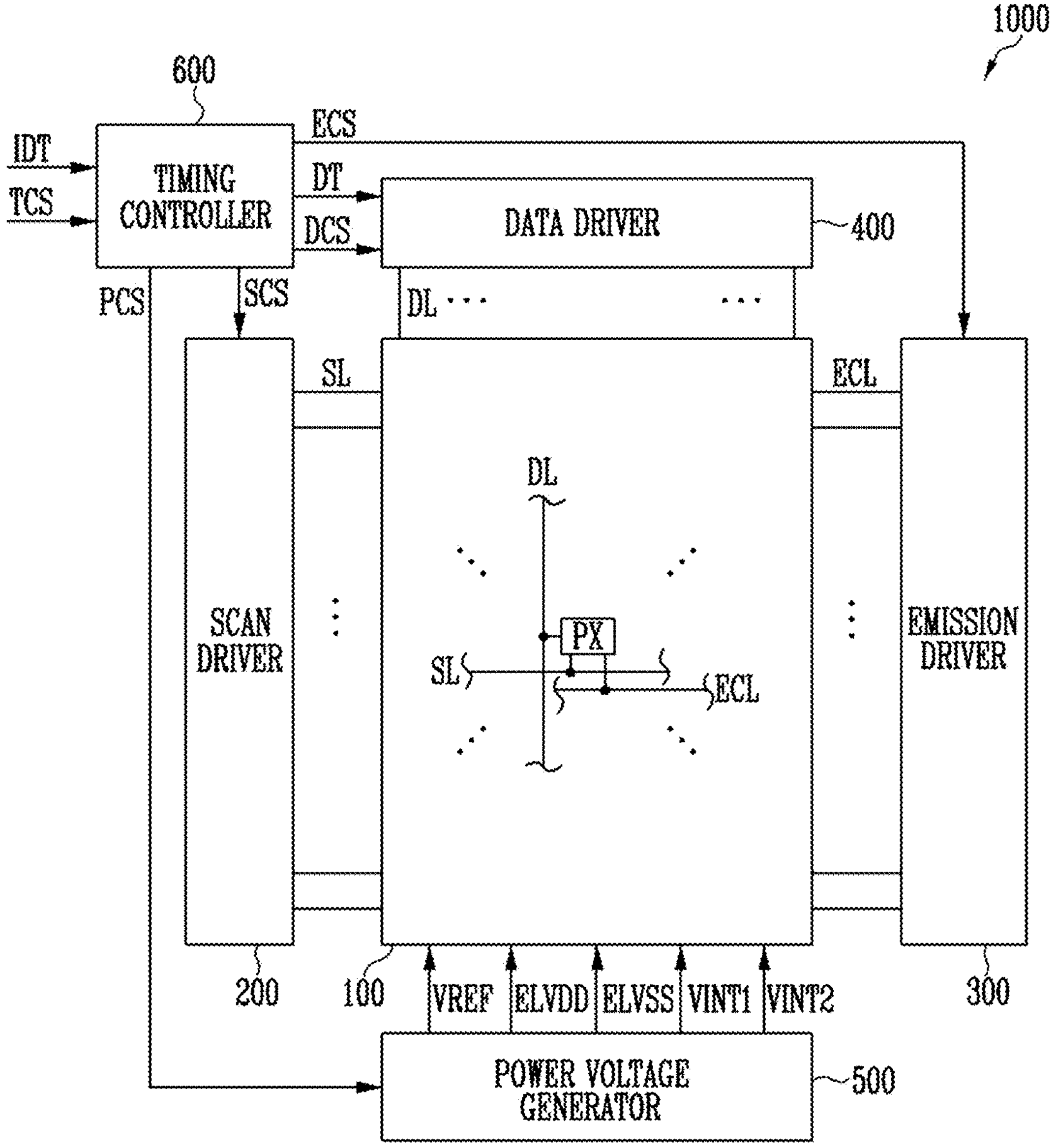
FIG. 1 illustrates a block diagram of a display device according to an embodiment of the present disclosure.
Figure 2:
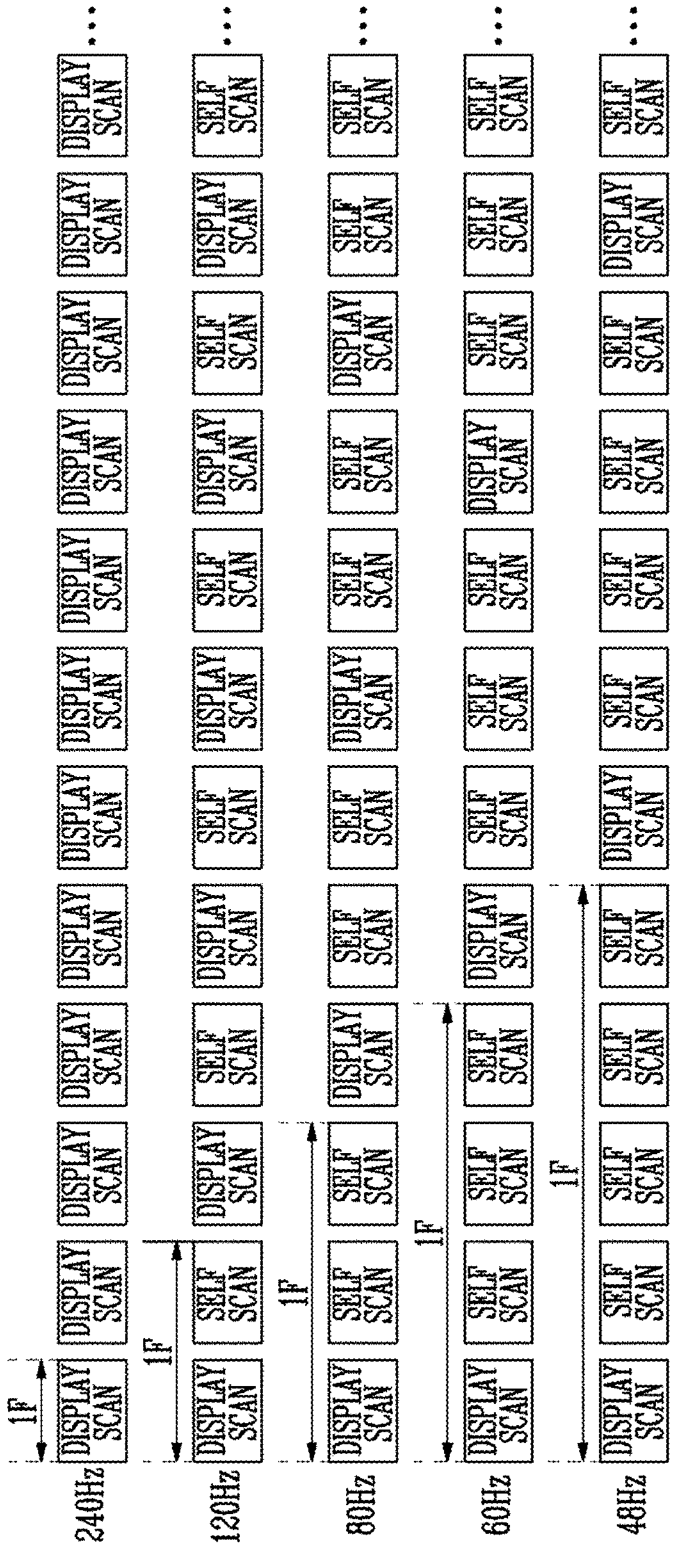
FIG. 2 illustrates a schematic view of a driving operation of the display device of FIG. 1.

FIG. 1 illustrates a block diagram of a display device according to an embodiment of the present disclosure. FIG. 2 illustrates a schematic view of a driving operation of the display device of FIG. 1.

Referring to FIG. 1, a display device 1000 may include a display panel 100, a scan driver 200, an emission driver 300, a data driver 400, a power voltage generator 500, and a timing controller 600. The display device 1000 may display images at various driving frequencies depending on driving conditions. For example, the display device 1000 may display an image at various driving frequencies of 1 Hz to 240 Hz (e.g., a frame rate of a panel driving frame is between 1 Hz to 240 Hz). However, this is merely an example, and the range of the driving frequencies is not limited to this range. In addition, the display device 1000 may be an organic light emitting display device or a quantum dot light emitting display device, but it is not limited to these types.

The display panel 100 displays an image. The display panel 100 may include a plurality of pixels PX for displaying a predetermined image, and may display an image corresponding to input image data IDT by the plurality of pixels PX.

The plurality of pixels PX may be electrically connected to respective scan lines SL, respective emission control lines ECL, and respective data lines DL. For example, each pixel PX may be electrically connected to the scan line SL and the emission control line ECL disposed on a corresponding horizontal line, and the data line DL disposed on a corresponding vertical line.

FIG. 1 illustrates that each pixel PX is connected to one scan line SL and one emission control line ECL, but the embodiments are not limited thereto. For example, two or more scan lines SL each carrying different scan signals may be disposed on each horizontal line, and each pixel PX may be electrically connected to the two or more scan lines SL. In addition, two or more emission control lines ECL, also carrying different scan signals, may be disposed on each horizontal line, and each pixel PX may be electrically connected to the two or more emission control lines ECL.

The plurality of pixels PX may receive respective driving signals, and may emit light with luminance corresponding to the driving signals. In the embodiment, the driving signals may include respective scan signals supplied to the plurality of pixels PX through respective scan lines SL, respective emission control signals EM supplied to the plurality of pixels PX through respective emission control lines ECL, and respective data signals supplied to the plurality of pixels PX through respective the data lines DL.

The plurality of pixels PX may receive driving voltages from the power voltage generator 500. In the embodiment, the driving voltages may include a first power voltage ELVDD (for example, a high-potential pixel voltage) and a second power voltage ELVSS (for example, a low-potential pixel voltage), and may include at least one of a reference voltage VREF, a first initialization voltage VINT1, and a second initialization voltage VINT2.

The signal lines and the power lines connected to the plurality of pixels PX, and the driving signals and the driving voltages supplied by the signal lines and the power lines are not limited to the embodiment described above.

The configuration of the signal lines and the power lines connected to the plurality of pixels PX can vary depending on the circuit structure and/or driving method of the plurality of pixels PX. Consequently, the driving signals, and/or the driving voltages may be variously changed.

The scan driver 200 may receive scan driving signals SCS from the timing controller 600. The scan driving signals SCS may include a sampling signal and/or timing signals necessary for driving the scan driver 200. The scan driver 200 may supply respective scan signals to the scan lines SL based on the scan driving signals SCS. In the embodiment, the scan signals may include a first initialization signal GI, a second initialization signal GB, a write signal GW, and a reset signal GR.

Each scan signal may have a gate-on voltage capable of turning on a transistor to which the scan signal is supplied. For example, a low-level scan signal may be supplied to a P-type transistor, and a high-level scan signal may be supplied to an N-type transistor. Accordingly, the transistor receiving each scan signal may be turned on in response to the scan signal.

The emission driver 300 may receive emission driving signals ECS from the timing controller 600. The emission driving signals ECS may include sampling signals and/or timing signals required for driving the emission driver 300. In the embodiment, the emission driver 300 may supply respective emission control signals to the emission control lines ECL based on the emission driving signals ECS. For example, the emission control signals may include a first emission control signal EM1 and a second emission control signal EM2.

In another embodiment, the emission driver 300 may supply respective first emission control signals EM1 to first emission control lines ECL1 and respective second emission control signals EM2 to second emission control lines ECL2, based on the emission driving signals ECS. For example, the emission driver 300 may sequentially supply the first emission control signals EM1 to the first emission control lines ECL1 and the second emission control signals EM2 to the second emission control lines ECL2, based on the emission driving signals ECS.

Each of the emission control signals EM1 and EM2 may have a gate-off voltage capable of turning off a transistor to which the emission control signals EM1 and EM2 are supplied. For example, a high-level emission control signal may be supplied to the P-type transistor, and a low-level emission control signal may be supplied to the N-type transistor. Accordingly, the transistor receiving each emission control signal may be turned off in response to the emission control signal to remain turned off during the period in which the emission control signal is supplied.

FIG. 1 illustrates the embodiment in which the scan driver 200 and the emission driver 300 are separately provided, but the embodiments are not limited thereto. For example, the scan driver 200 and the emission driver 300 may be integrated into one driving circuit or one module.

The data driver 400 may receive data driving signals DCS and image data DT from the timing controller 600. The data driving signals DCS may include a sampling signal and/or timing signals necessary for driving the data driver 400. The data driver 400 may supply respective data signals to the data lines DL based on the data driving signals DCS and the image data DT. For example, the data driver 400 may generate data signals with analog data voltages corresponding to the grayscale values in the image data DT supplied as digital data, and then output these data signals to the respective data lines DL. The data signals outputted to the data lines DL may be supplied to each pixel PX.

The power voltage generator 500 may receive power driving signals PCS from the timing controller 600. The power voltage generator 500 may generate driving voltages for the plurality of pixels PX based on the power driving signals PCS, and supply these driving voltages to the display panel 100 through the respective power lines. In the embodiment, the power voltage generator 500 may be a power management integrated circuit (PMIC) or may include a PMIC.

In the embodiment, the power voltage generator 500 may generate the first power voltage ELVDD, the second power voltage ELVSS, the reference voltage VREF, the first initialization voltage VINT1, and the second initialization voltage VINT2 to supply them to the display panel 100. Accordingly, the first power voltage ELVDD, the second power voltage ELVSS, the reference voltage VREF, the first initialization voltage VINT1, and the second initialization voltage VINT2 may be supplied to each of the pixels PX.

The timing controller 600 may receive the input image data IDT and timing control signals TCS from a host system (for example, an application processor (AP)) through an interface. The timing control signals TCS may include synchronization signals such as a vertical synchronization signal and a horizontal synchronization signal, a data enable signal, a clock signal, and the like.

The timing controller 600 may generate the scan driving signals SCS, the emission driving signals ECS, the data driving signals DCS, and the power driving signals PCS based on the timing control signals TCS. The scan driving signals SCS, the emission driving signals ECS, the data driving signals DCS, and the power driving signals PCS may be supplied to the scan driver 200, the emission driver 300, the data driver 400, and the power voltage generator 500, respectively.

When the driving time of the panel driving frame is the reference driving time, each pixel PX performs one display scan operation (e.g., an operation that receives the data signal to cause the light emitting element to emit light). If the driving time of the panel driving frame is not the reference driving time, each pixel PX may perform one display scan operation and at least one or more self-scan operations (e.g., an operation that changes the characteristics of the driving transistor). In this case, the reference driving time may be a minimum driving time.

As shown in FIG. 2, the timing controller 600 may perform one display scan period (DISPLAY SCAN) at the maximum driving frequency of the display panel 100 (e.g., in FIG. 2, it is assumed that the maximum driving frequency of the display panel 100 is 240 Hz), and the timing controller 600 may perform one display scan period (DISPLAY SCAN) and at least one or more self-scan periods (SELF SCAN) at driving frequencies (e.g., 120 Hz, 80 Hz, 60 Hz, and 48 Hz) excluding the maximum driving frequency of the display panel 100. For example, when the driving frequency of the display panel 100 is 240 Hz, one panel driving frame (1F) may include one display scan period (DISPLAY SCAN); when the driving frequency of the display panel 100 is 120 Hz, one panel driving frame (1F) may include one display scan period (DISPLAY SCAN) and one self-scan period (SELF SCAN); when the driving frequency of the display panel 100 is 80 Hz, one panel driving frame (1F) may include one display scan period (DISPLAY SCAN) and two self-scan periods (SELF SCAN); when the driving frequency of the display panel 100 is 60 Hz, one panel driving frame (1F) may include one display scan period (DISPLAY SCAN) and three self-scan periods (SELF SCAN); and when the driving frequency of the display panel 100 is 48 Hz, one panel driving frame (1F) may include one display scan period (DISPLAY SCAN) and four self-scan periods (SELF SCAN). As described above, the timing controller 600 can accommodate variations in the driving frequency of the display panel 100 (e.g., the variable frame rate or variable driving time of the panel driving frame) by adjusting the number of self-scan periods (SELF SCAN).

Figure 3:
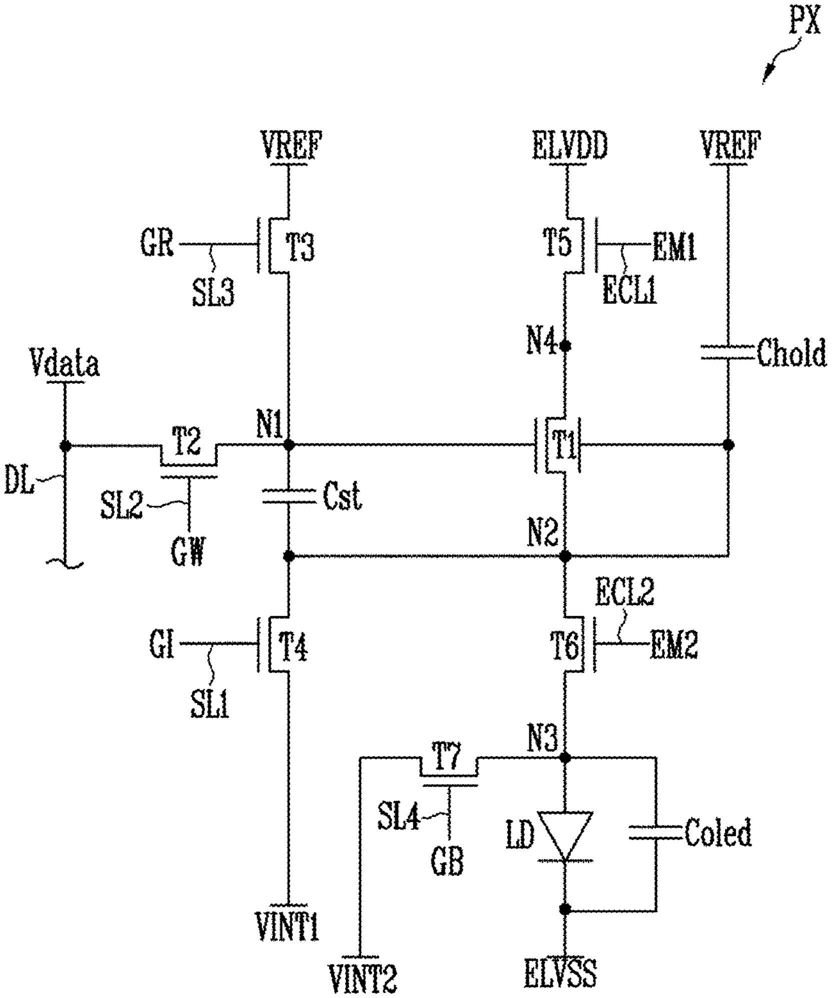
FIG. 3 illustrates a circuit diagram of a pixel according to an embodiment of the present disclosure.

FIG. 3 illustrates a circuit diagram of a pixel according to an embodiment of the present disclosure.

Referring to FIG. 3, the pixel PX according to the embodiment of the present disclosure may be connected to signal lines provided in the corresponding horizontal and vertical lines. For example, the pixel PX may be connected to at least one scan line SL disposed on the corresponding horizontal line, at least one emission control line ECL, and the data line DL disposed on the corresponding vertical line. More specifically, the pixel PX may be connected to a first scan line SL1, a second scan line SL2, a third scan line SL3, a fourth scan line SL4, the first emission control line ECL1, and the second emission control line ECL2 of the corresponding horizontal line, and the data line DL of the corresponding vertical line.

The pixel PX may include first to seventh transistors T1 to T7, first and second capacitors Cst and Chold, and a light emitting element LD. In addition, the pixel PX may further include a parasitic capacitor Coled between the anode electrode and the cathode electrode of the light emitting element LD. The pixel PX may be driven by driving signals and driving voltages. The driving signals may include the write signal GW and a data signal (for example, a data voltage Vdata). In the embodiment, the driving signals may further include the reset signal GR, the first initialization signal GI, the second initialization signal GB, the first emission control signal EM1, and the second emission control signal EM2. The driving voltages may include the first power voltage ELVDD and the second power voltage ELVSS. In the embodiment, the driving voltages may further include the reference voltage VREF, the first initialization voltage VINT1, and/or the second initialization voltage VINT2.

The first transistor T1 may also be referred to as a driving transistor. A first gate electrode of the first transistor T1 may be connected to a first node N1. The first transistor T1 may be connected between a fourth node N4 and a second node N2. As shown in FIG. 3, the first transistor T1 may receive the first power voltage ELVDD through the fifth transistor T5.

The first transistor T1 may supply a driving current toward the light emitting element LD. For example, the first transistor T1 may supply a driving current corresponding to a voltage of the first node N1, in other words, a data voltage Vdata, to the light emitting element LD.

In the embodiment, the first transistor T1 may be implemented as an N-type transistor. In this case, a semiconductor layer of the first transistor T1 may be an oxide semiconductor. The first transistor T1 may further include a second gate electrode overlapping a channel disposed on the semiconductor layer thereof. A second gate electrode of the first transistor T1 may be referred to as an overlapping electrode. The second gate electrode of the first transistor T1 may be connected to the second node N2.

The second transistor T2 may also be referred to as a first switching transistor. A gate electrode of the second transistor T2 is connected to the second scan line SL2. The second transistor T2 may be connected between the data line DL and the first node N1.

The second transistor T2 may be turned on in response to the write signal GW applied to the second scan line SL2. When the second transistor T2 is turned on, the data signal (for example, the data voltage Vdata) supplied to the data line DL may be transmitted to the first node N1.

The third transistor T3 may be referred to as a second switching transistor T3. A gate electrode of the third transistor T3 may be connected to the third scan line SL3. The third transistor T3 may be connected between the reference voltage VREF and the first node N1.

The third transistor T3 may be turned on in response to the reset signal GR applied to the third scan line SL3. When the third transistor T3 is turned on, the reference voltage VREF may be transmitted to the first node N1.

The fourth transistor T4 may be referred to as a first initialization transistor. A gate electrode of the fourth transistor T4 may be connected to the first scan line SL1. The fourth transistor T4 may be connected between the second node N2 and the first initialization voltage VINT1.

The fourth transistor T4 may be turned on in response to the first initialization signal GI applied to the first scan line SL1. When the fourth transistor T4 is turned on, the first initialization voltage VINT1 may be transmitted to the second node N2, and accordingly, a threshold voltage of the driving transistor T1 may be compensated.

The fifth transistor T5 may be referred to as a third switching transistor. A gate electrode of the fifth transistor T5 may be connected to the first emission control line ECL1. The fifth transistor T5 may be connected between the first power voltage ELVDD and the fourth node N4.

The fifth transistor T5 may be turned off in response to the first emission control signal EM1 supplied to the first emission control line ECL1. Since the fifth transistor T5 is connected to the first transistor T1 through the fourth node N4, when the fifth transistor T5 is turned off, the current path for the driving current is blocked within the pixel PX. Consequently, the driving current is not supplied to the light emitting element LD.

The sixth transistor T6 may be referred to as a control transistor. A gate electrode of the sixth transistor T6 may be connected to the second emission control line ECL2. The sixth transistor T6 may be connected between the second node N2 and the third node N3. For example, a first electrode of the sixth transistor T6 may be connected to the second node N2, and a second electrode of the sixth transistor T6 may be connected to the third node N3.

The sixth transistor T6 may be turned off in response to the second emission control signal EM2 supplied to the second emission control line ECL2. When the sixth transistor T6 is turned off, the current path from the first transistor T1 to the light emitting element LD is blocked, and consequently, the driving current is not supplied to the light emitting element LD.

The sixth transistor T6 may separate the points where the first initialization voltage VINT1 and the second initialization voltage VINT2 are applied. For example, when the fourth transistor T4 is turned on, the first initialization voltage VINT1 may be applied to the second node N2, and when the seventh transistor T7 is turned on, the second initialization voltage VINT2 may be applied to the third node N3. Consequently, the compensation of the threshold voltage of the first transistor T1 and the initialization of the anode of the light emitting element LD may be independently controlled.

The seventh transistor T7 may be referred to as a second initialization transistor. A gate electrode of the seventh transistor T7 may be connected to the fourth scan line SL4.

The seventh transistor T7 may be connected between the third node N3 and the second initialization voltage VINT2. The seventh transistor T7 may be turned on in response to the second initialization signal GB applied to the fourth scan line SL4. When the seventh transistor T7 is turned on, the second initialization voltage VINT2 may be applied to the third node N3, and consequently, the anode of the light emitting element LD may be initialized.

The first to seventh transistors T1 to T7 may be N-type transistors, but the present disclosure is not limited thereto. For example, at least one or more of the first to seventh transistors T1 to T7 may be changed to a P-type transistor.

The first capacitor Cst may be connected between the first node N1 and the second node N2. A voltage corresponding to a data signal may be stored in the first capacitor Cst. Accordingly, the first capacitor Cst may be referred to as a storage capacitor.

The second capacitor Chold may be connected between the reference voltage VREF and the second node N2. The second capacitor Chold may stabilize the voltage of the second node N2.

The light emitting element LD may be connected between the third node N3 and the second power voltage ELVSS. For example, the light emitting element LD may be connected forward between the third node N3 and the second power voltage ELVSS.

When the driving current is supplied from the first transistor T1, the light emitting element LD may emit light with luminance corresponding to the driving current.

In the embodiment, the light emitting element LD may include an organic light emitting diode. In another embodiment, the light emitting element LD may include at least one inorganic light emitting diode. The type, size, and/or number of the light emitting elements LD may be changed according to embodiments of the present disclosure.

Figure 4:
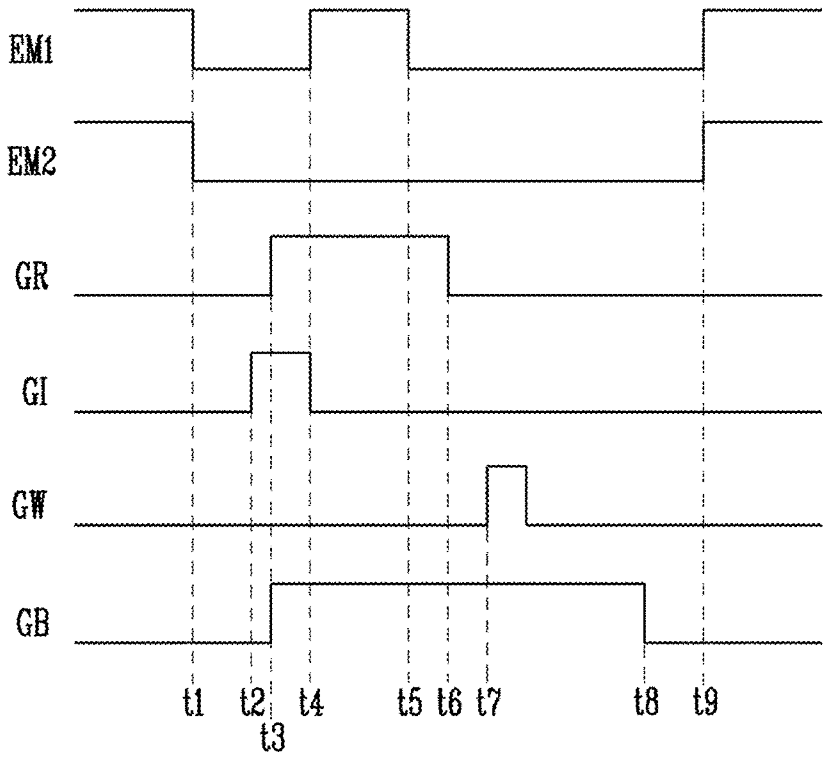
FIG. 4 illustrates a timing diagram of driving signals supplied to the pixel of FIG. 3 in a display scan period according to an embodiment of the present disclosure.

FIG. 4 illustrates a timing diagram of driving signals supplied to the pixel of FIG. 3 in a display scan period according to an embodiment of the present disclosure.

Referring to FIG. 4, examples of the first and second emission control signals EM1 and EM2, the reset signal GR, the first initialization signal GI, the write signal GW, and the second initialization signal GB that control the operation timing of the pixel PX are illustrated. In the display panel 100 of FIG. 1, the pixels PX disposed on the same horizontal line may be simultaneously driven, and the pixels PX disposed on different horizontal lines may be sequentially driven corresponding to respective horizontal periods.

In FIG. 4, a period (t1-t9) corresponds to a non-emission period, and a period after time t9 correspond to an emission period.

At time t1, the voltage levels of the first and second emission signals EM1 and EM2 may transition to the gate-off voltage level. In other words, at time t1, the low-level first and second emission control signals EM1 and EM2 are supplied. Accordingly, the fifth and sixth transistors T5 and T6 are turned off.

When the fifth and sixth transistors T5 and T6 are turned off, an initialization operation of the pixel PX may be performed. For example, at time t2, the first initialization signal GI of the gate-on voltage level is supplied to the gate electrode of the fourth transistor T4. In addition, at time t3, the second initialization signal GB of the gate-on voltage level is supplied to the gate electrode of the seventh transistor T7. Accordingly, at time t2, the first initialization voltage VINT1 is supplied to the second node N2, and at time t3, the second initialization voltage VINT2 is supplied to the third node N3.

In this case, the first initialization voltage VINT1 may be set to a voltage level that compensates for a threshold voltage of the first transistor T1, which will be described later. The second initialization voltage VINT2 may be set to a voltage level that compensates for the temperature sensitivity of the light emitting element LD. In the embodiment, the second initialization voltage VINT2 may be a higher voltage level than the first initialization voltage VINT1. For example, the first initialization voltage VINT1 may be −3 V, and the second initialization voltage VINT2 may be 0 V.

Meanwhile, to maintain the light emitting element LD in a non-emission state during the initialization operation, the second initialization voltage VINT2 may be set to a voltage level lower than the threshold voltage of the light emitting element LD. This ensures that the light emitting element LD remains in a non-emission state.

Although FIG. 4 illustrates that time t2 when the first initialization voltage VINT1 is supplied to the second node N2 and time t3 when the second initialization voltage VINT2 is supplied to the third node N3 are different from each other, the present disclosure is not limited thereto. For example, the first and second initialization voltages VINT1 and VINT2 may be simultaneously supplied to the second and third nodes N2 and N3.

Through the above-described initialization operation, the voltages of the second and third nodes N2 and N3 of the pixel PX may be initialized so they are not affected by the data signal supplied in the previous unit period (for example, the previous frame period).

Meanwhile, with the initialization of the third node N3, the threshold voltage compensation operation of the first transistor T1 may begin at time t3. Specifically, the reference voltage VREF may be supplied to the first node N1 by turning on the third transistor T3 at time t3. To achieve this, at time t3, the reset signal GR of the gate-on voltage may be applied to the gate electrode of the third transistor T3.

At time t4, the first initialization signal GI may transition to the gate-off voltage level, turning off the fourth transistor T4. In addition, at time t4, the first emission control signal EM1 may transition to the gate-on voltage level, turning on the fifth transistor T5, which allows the first power voltage ELVDD to be transmitted to the fourth node N4.

During the threshold voltage compensation operation, regardless of the second initialization voltage VINT2 used to initialize the anode of the light emitting element LD, threshold voltage compensation may be performed according to the first initialization voltage VINT1 set to a voltage level for compensating the threshold voltage of the first transistor T1. Specifically, during the period (t4-t5), the voltage of the first node N1 is maintained at the reference voltage VREF, while the voltage of the second node N2 changes from the first initialization voltage VINT1 to a value obtained by subtracting the threshold voltage of the first transistor T1 from the reference voltage VREF. Consequently, a threshold voltage of the driving transistor T1, corresponding to a difference between the voltage of the first node N1 and the voltage of the second node N2, may be stored in the first capacitor Cst. Subsequently, at time t5, the first emission control signal EM1 may be changed to the gate-off voltage level, and at time t6, the reset signal GR may be changed to the gate-off voltage level.

Thereafter, at time t7, the data writing operation of the pixel PX may begin. At time t7, the second transistor T2 may be turned on to apply a data signal to the first node N1. To accomplish this, at time t7, the write signal GW of the gate-on voltage may be supplied to the second scan line SL2. Accordingly, the second transistor T2 is turned on at time t7.

While the second transistor T2 is turned on, the voltage of the first node N1 may be maintained at the voltage of the data signal (for example, the data voltage Vdata), and the voltage of the second node N2 may be maintained at (VREF-Vth) voltage. However, this is not a limitation of the present disclosure. For example, while the second transistor T2 is turned on, the voltage at the first node N1 may change from the reference power voltage VREF to the data voltage Vdata, and the voltage at the second node N2 may change in response to the voltage change at the first node N1 due to the coupling of the first capacitor Cst. However, in the embodiment of the present disclosure, the capacitance of the second capacitor Chold may be set to be greater than that of the first capacitor Cst, thereby minimizing the amount of voltage change at the second node N2 while the second transistor T2 is turned on. For better understanding and ease of description, it is assumed that the second node N2 maintains the (VREF-Vth) voltage while the second transistor T2 is turned on.

When the data writing operation is completed, the second transistor T2 may be turned off. Meanwhile, at time t8, the second initialization signal GB of the gate-off voltage level is supplied to the gate electrode of the seventh transistor T7. Accordingly, the seventh transistor T7 is turned off at time t8.

Finally, the emission operation of the pixel PX may be performed from time t9. At time t9, the first and second emission control signals EM1 and EM2 of the gate-on voltage level are applied to the gate electrodes of the fifth and sixth transistors T5 and T6, respectively. Accordingly, a driving current corresponding to the voltage stored in the first capacitor Cst may be supplied to the light emitting element LD by the first transistor T1.

Figure 5:
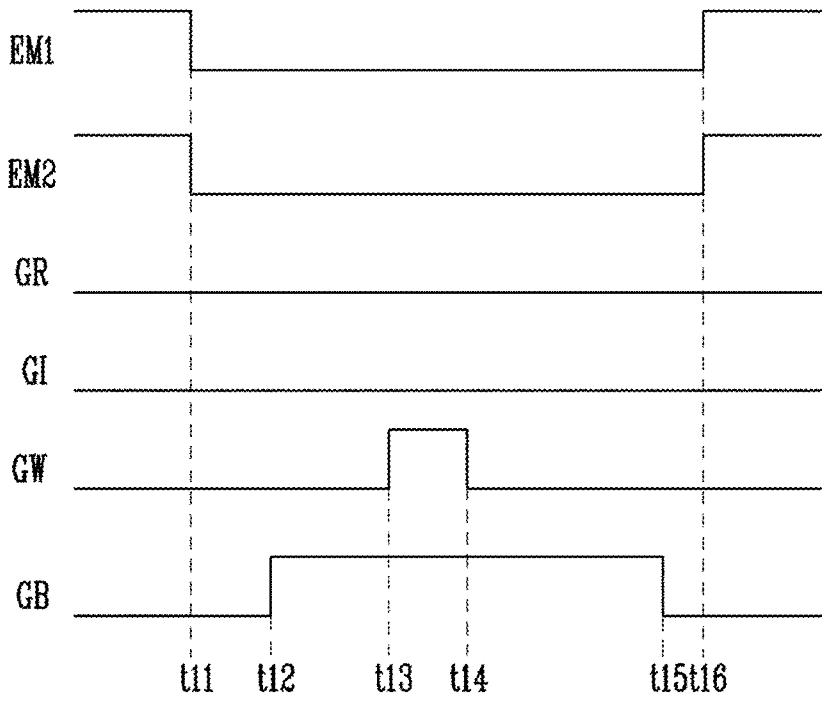
FIG. 5 illustrates a timing diagram of driving signals supplied to the pixel of FIG. 3 in a self-scan period according to an embodiment of the present disclosure.

FIG. 5 illustrates a timing diagram of driving signals supplied to the pixel of FIG. 3 in a self-scan period according to an embodiment of the present disclosure. In FIG. 5, a period (t11-t16) corresponds to a non-emission period, and a period after time t16 correspond to an emission period.

Referring to FIG. 5, at time t11, the voltage levels of the first and second emission signals EM1 and EM2 may transition to the gate-off voltage level. In other words, at time t1, the low-level first and second emission control signals EM1 and EM2 are supplied. Accordingly, the fifth and sixth transistors T5 and T6 are turned off.

In the self-scan period, the initialization operation for the second node N2 may not be performed. Meanwhile, in the self-scan period, the initialization operation for the third node N3 may be performed. To accomplish this, at time t12, the second initialization signal GB of the gate-on voltage level is supplied to the gate electrode of the seventh transistor T7, and accordingly, the seventh transistor T7 is turned on and the second initialization voltage VINT2 is supplied to the third node.

In the self-scan period, the threshold voltage compensation operation of the first transistor T1 may not be performed. Accordingly, the reset signal GR may maintain the gate-off voltage level, and the first emission control signal EM1 may also maintain the gate-off voltage level until time t16.

Meanwhile, at time t13, the data writing operation of the pixel PX may begin. At time t13, the second transistor T2 may be turned on to apply a data signal to the first node N1. To accomplish this, at time t13, the write signal GW of the gate-on voltage level may be supplied to the second scan line SL2. Accordingly, the second transistor T2 is turned on at time t13.

When the data writing operation is completed, the second transistor T2 may be turned off at time t14. Meanwhile, at time t15, the second initialization signal GB of the gate-off voltage level is supplied to the seventh transistor T7. Accordingly, the seventh transistor T7 is turned off at time t15.

Finally, the emission operation of the pixel PX may be performed from time t16. At time t16, the first and second emission control signals EM1 and EM2 of the gate-on voltage level are applied to the gate electrodes of the fifth and sixth transistors T5 and T6, respectively. Accordingly, a driving current corresponding to the voltage stored in the first capacitor Cst may be supplied to the light emitting element LD by the first transistor T1.

Referring to FIG. 5, an embodiment is illustrated where the data writing operation of the pixel PX is performed during the period (t13-t14) of the self-scan period. However, the present disclosure is not limited thereto, and the data writing operation of the pixel PX may also occur outside of the self-scan period. In such cases, the write signal GW may maintain the gate-off voltage level during the self-scan period.

Figure 6:
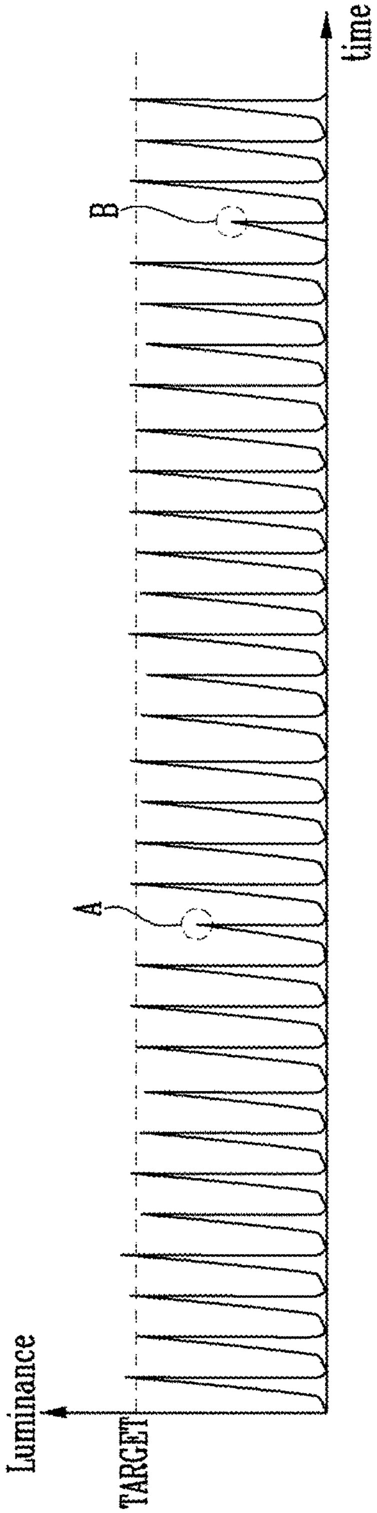
FIG. 6 illustrates a graph of luminance of a light emitting element when a pixel is operated according to the embodiment of FIG. 4 and FIG. 5.

FIG. 6 illustrates a graph of luminance of a light emitting element when a pixel is operated according to the embodiment of FIG. 4 and FIG. 5. Referring to FIG. 6, when the pixel PX is driven using a predetermined data voltage Vdata, the graph shows the luminance of light generated by the light emitting element LD of the pixel PX over 32 frames.

The data voltage Vdata may be predetermined to emit light at a target luminance. Referring to FIG. 6, most of the light emitting elements of the pixel PX generate light at the target luminance over 32 frames. However, there are instances, at points A and B, where the light does not reach the target luminance. This issue may arise because during the high-speed operation of the display panel 100, the simultaneous changes in the voltage levels of the first and second emission control signals EM1 and EM2 can cause momentary instability in the voltages of the fourth node N4, the second node N2, and the third node N3.

According to the embodiment of the present disclosure, when entering the non-emission period from the emission period, the voltage levels of the first and second emission control signals EM1 and EM2 may be sequentially changed, and when entering the emission period from the non-emission period, the voltage levels of the first and second emission control signals EM1 and EM2 may be sequentially changed.

Meanwhile, according to the embodiment of the present disclosure, the first initialization voltage VINT1 is again applied to the second node N2 before entering the emission period after the data writing operation is completed.

Accordingly, it is possible to prevent the voltages of the first node N1, the second node N2, and the third node N3 from momentarily becoming unstable As a result, the issue of luminance deterioration in some frames during the high-speed operation of the pixel PX can be reduced.

Figure 7:
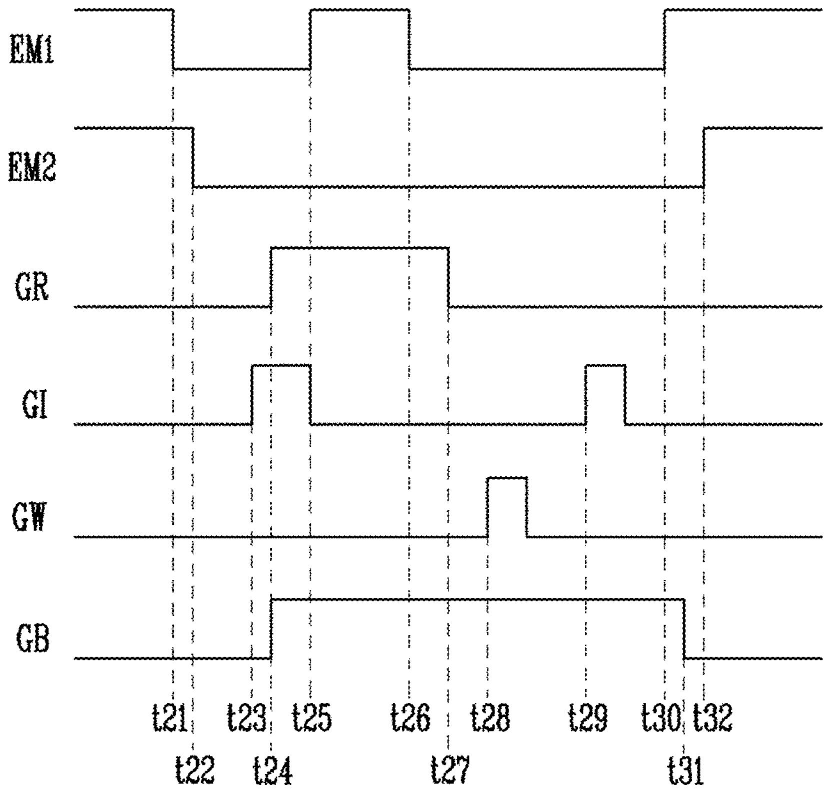
FIG. 7 illustrates a timing diagram of driving signals supplied to the pixel of FIG. 3 in a display scan period according to another embodiment of the present disclosure.

FIG. 7 illustrates a timing diagram of driving signals supplied to the pixel of FIG. 3 in a display scan period according to another embodiment of the present disclosure.

Referring to FIG. 7, examples of the first and second emission control signals EM1 and EM2, the reset signal GR, the first initialization signal GI, the write signal GW, and the second initialization signal GB that control the operation timing of the pixel PX are illustrated. In the description of FIG. 7, overlapping content with the description of FIG. 4 will be omitted.

At time t21, the voltage level of the first emission signal EM1 transitions to the gate-off voltage level, and at time t22, the voltage level of the second emission signal EM2 transitions to the gate-off voltage level. In other words, when the pixel PX enters the non-emission period from the display scan period, the fifth transistor T5 and the sixth transistor T6 are sequentially turned off.

When the fifth and sixth transistors T5 and T6 are turned off, an initialization operation of the pixel PX may be performed. Specifically, at time t23, the first initialization signal GI of the gate-on voltage level is supplied to the gate electrode of the fourth transistor T4. In addition, at time t24, the second initialization signal GB of the gate-on voltage level is supplied to the gate electrode of the seventh transistor T7. Accordingly, at time t23, the first initialization voltage VINT1 is supplied to the second node N2, and at time t24, the second initialization voltage VINT2 is supplied to the Meanwhile, with the initialization of the third node N3, the threshold voltage compensation operation of the first transistor T1 may begin at time t24. Specifically, the reference voltage VREF may be supplied to the first node N1 by turning on the third transistor T3 at time t24. To achieve this, at time t24, the reset signal GR of the gate-on voltage may be applied to the gate electrode of the third transistor T3.

Meanwhile, at time t25, the first initialization signal GI may transition to the gate-off voltage level. Accordingly, the fourth transistor T4 is turned off. In addition, at time t25, the first emission control signal EM1 may transition to the gate-on voltage level. Accordingly, the fifth transistor T5 is turned on so that the first power voltage ELVDD is transmitted to the fourth node N4. Accordingly, a threshold voltage of the driving transistor T1 corresponding to a difference between the voltage of the first node N1 and the voltage of the second node N2 may be stored in the first capacitor Cst.

Thereafter, at time t26, the first emission control signal EM1 may be changed to the gate-off voltage level, and at time t27, the reset signal GR may be changed to the gate-off voltage level.

Thereafter, at time t28, the data writing operation of the pixel PX may begin. At time t28, the second transistor T2 may be turned on to apply a data signal to the first node N1. When the data writing operation is completed, the second transistor T2 may be turned off.

Meanwhile, at time t29, the first initialization signal GI of the gate-on voltage level is supplied to the gate of the fourth transistor T4. Accordingly, at time t29, the fourth transistor T4 is turned on, and the first initialization voltage VINT1 is transmitted to the second node N2. After the voltage of the second node N2 is initialized to the first initialization voltage VINT1, the fourth transistor T4 is turned off again.

In FIG. 7, it can be observed that the initialization operation of the second node N2 is performed twice. Specifically, during the non-emission period, the initialization operation of the second node N2 is carried out before the data writing operation of the pixel PX, and again after the data writing operation of the pixel PX.

Thereafter, at time t30, the first emission control signal EM1 of the gate-on voltage level is applied to the gate electrode of the fifth transistor T5; at time t31, the second initialization signal GB of the gate-off voltage level is applied to the gate electrode of the seventh transistor T7; and at time t32, the second emission control signal EM2 of the gate-on voltage level is applied to the gate electrode of the sixth transistor T6. In other words, at time t30, the fifth transistor T5 is turned on; at time t31, the seventh transistor T7 is turned off; and at time t32, the sixth transistor T6 is turned on.

Specifically, when the pixel PX enters the emission period, the fifth transistor T5 and the sixth transistor T6 are sequentially turned on. Meanwhile, when the pixel PX enters the emission period, the seventh transistor T7 is turned off between the turn-on point of the fifth transistor T5 and the turn-on point of the sixth transistor T6.

Accordingly, in the display scan period, it is possible to prevent the voltages of the first node N1, the second node N2, and the third node N3 of the pixel from momentarily becoming unstable. As a result, the issue of luminance deterioration in some frames during the high-speed operation of the pixel can be reduced.

Figure 8:
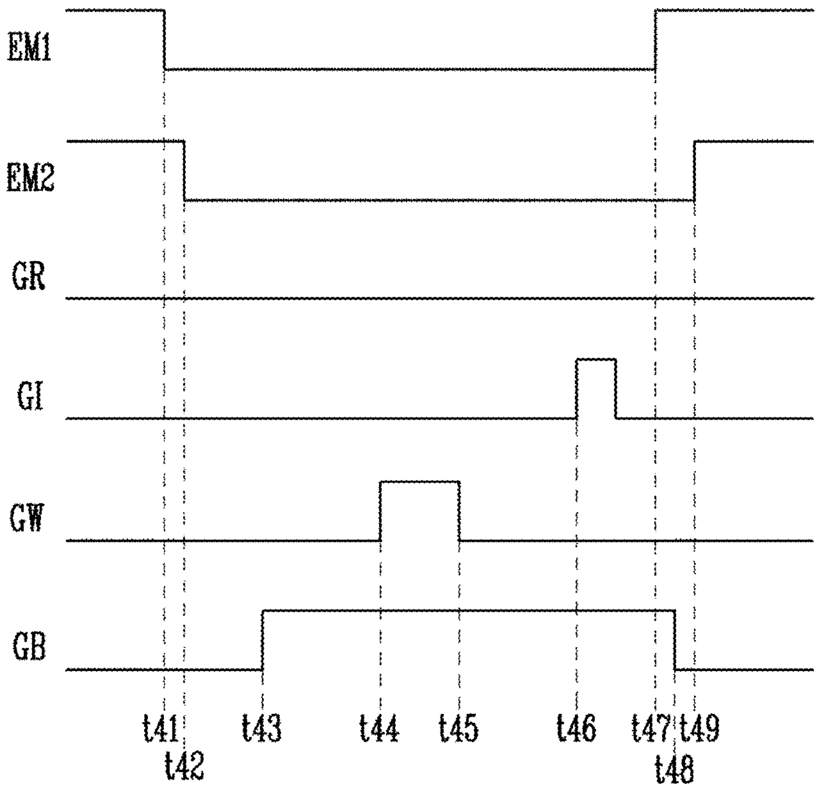
FIG. 8 illustrates a timing diagram of driving signals supplied to the pixel of FIG. 3 in a self-scan period according to another embodiment of the present disclosure.

FIG. 8 illustrates a timing diagram of driving signals supplied to the pixel of FIG. 3 in a self-scan period according to another embodiment of the present disclosure. In FIG. 8, a period (t41-t49) corresponds to a non-emission period, and a period after time t49 correspond to an emission period. In the description of FIG. 8, overlapping content with the description of FIG. 5 will be omitted.

At time t41, the voltage level of the first emission signal EM1 transitions to the gate-off voltage level, and at time t42, the voltage level of the second emission signal EM2 transitions to the gate-off voltage level. In other words, when the pixel PX enters the non-emission period from the self-scan period, the fifth transistor T5 and the sixth transistor T6 are sequentially turned off.

In the self-scan period, the initialization operation for the second node N2 may not be performed. Meanwhile, in the self-scan period, the initialization operation for the third node N3 may be performed. To achieve this, at time t43, the second initialization signal GB of the gate-on voltage level is supplied to the gate electrode of the seventh transistor T7. Consequently, the seventh transistor T7 is turned on and the second initialization voltage VINT2 is supplied to the third node.

In the self-scan period, the threshold voltage compensation operation of the first transistor T1 may not be performed. Accordingly, the reset signal GR may maintain the gate-off voltage level, and the first emission control signal EM1 may also maintain the gate-off voltage level until time t47.

Meanwhile, at time t44, the data writing operation of the pixel PX may begin. At time t44, the second transistor T2 may be turned on to apply a data signal to the first node N1. When the data writing operation is completed, the second transistor T2 may be turned off at time t45.

Meanwhile, at time t46, the first initialization signal GI of the gate-on voltage level is supplied to the gate of the fourth transistor T4. Accordingly, at time t46, the fourth transistor T4 is turned on, and the first initialization voltage VINT1 is transmitted to the second node N2. After the voltage of the second node N2 is initialized to the first initialization voltage VINT1, the fourth transistor T4 is turned off again.

In FIG. 8, it can be observed that the initialization operation of the second node N2 is performed twice. Specifically, during the non-emission period, the initialization operation of the second node N2 is carried out before the data writing operation of the pixel PX, and again after the data writing operation of the pixel PX.

Thereafter, at time t47, the first emission control signal EM1 of the gate-on voltage level is applied to the gate electrode of the fifth transistor T5; at time t48, the second initialization signal GB of the gate-off voltage level is applied to the gate electrode of the seventh transistor T7; and at time t49, the second emission control signal EM2 of the gate-on voltage level is applied to the gate electrode of the sixth transistor T6. Specifically, at time t47, the fifth transistor T5 is turned on; at time t48, the seventh transistor T7 is turned off; and at time t49, the sixth transistor T6 is turned on.

In other words, when the pixel PX enters the emission period, the fifth transistor T5 and the sixth transistor T6 are sequentially turned on. Meanwhile, when the pixel PX enters the emission period, the seventh transistor T7 is turned off between the turn-on point of the fifth transistor T5 and the turn-on point of the sixth transistor T6.

Accordingly, in the self-scan period, it is possible to prevent the voltages of the first node N1, the second node N2, and the third node N3 of the pixel from momentarily becoming unstable. As a result, the issue of deteriorating luminance in some frames during the high-speed operation of the pixel PX can be reduced.

Figure 9:
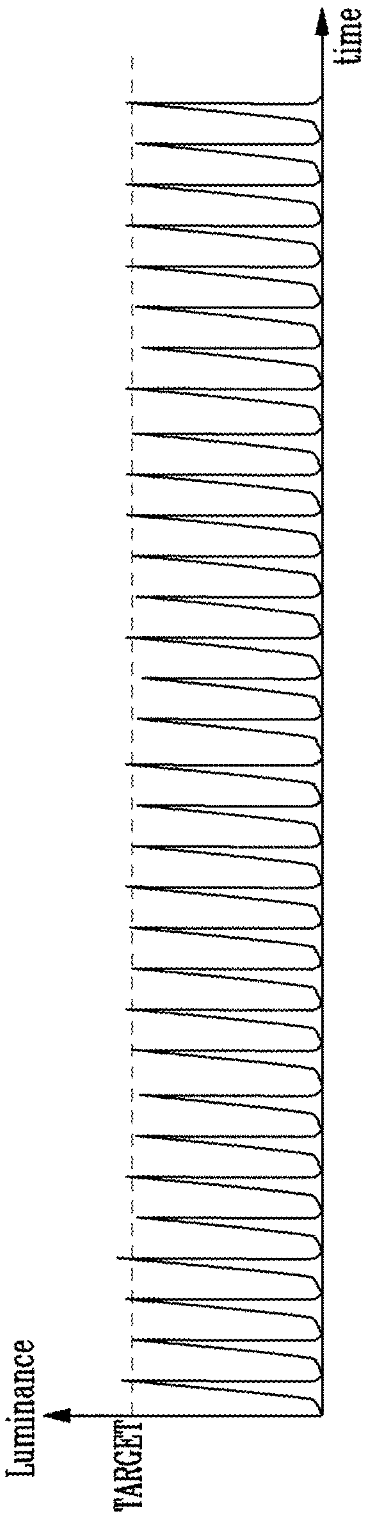
FIG. 9 illustrates a graph of luminance of a light emitting element LD when a pixel is operated according to the embodiment of FIG. 7 and FIG. 8.

FIG. 9 illustrates a graph of luminance of a light emitting element LD when a pixel is operated according to the embodiment of FIG. 7 and FIG. 8. Referring to FIG. 9, when the pixel PX is driven using a predetermined data voltage Vdata, a graph showing the luminance of light generated by the light emitting element LD of the pixel for 32 frames is shown.

Referring to FIG. 9, it can be seen that all light emitting elements of the pixel PX generate light of a target luminance during 32 frames. As described above, according to the embodiment of the present disclosure, in the display scan period and/or self-scan period, when entering the non-emission period from the emission period, the voltage levels of the first and second emission control signals EM1 and EM2 may be sequentially changed, and when entering the emission period from the non-emission period, the voltage levels of the first and second emission control signals EM1 and EM2 may be sequentially changed. In addition, according to the embodiment of the present disclosure, the first initialization voltage VINT1 is again applied to the second node N2 before entering the emission period after the data writing operation is completed. Meanwhile, according to an embodiment, when the pixel PX enters the emission period, the seventh transistor T7 is turned off between the turn-on point of the fifth transistor T5 and the turn-on point of the sixth transistor T6.

Accordingly, in the self-scan period, it is possible to prevent the voltages of the first node N1, the second node N2, and the third node N3 of the pixel from momentarily becoming unstable. As a result, the issue of deteriorating luminance in some frames during the high-speed operation of the pixel PX can be reduced.

A display device according to an embodiment is applicable to various types of electronic devices. In an embodiment, an electronic device includes the above-described display device and may further include other modules or devices having additional functions in addition to the display device.

Figure 10:
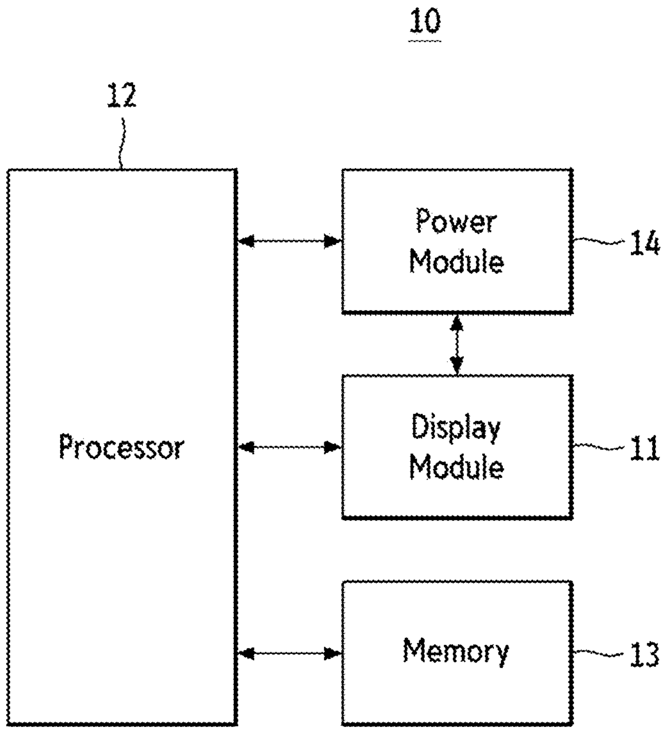
FIG. 10 is a block diagram of an electronic device according to an embodiment.

FIG. 10 is a block diagram of an electronic device according to an embodiment. Referring to FIG. 10, the electronic device 10 may include a display module 11, a processor 12, a memory 13, and a power module 14.

The processor 12 may include at least one of a central processing unit (CPU), an application processor (AP), a graphic processing unit (GPU), a communication processor (CP), an image signal processor (ISP), and a controller.

The memory 13 may store data and/or information used to operate the processor 12 or the display module 11. When the processor 12 executes an application stored in the memory 13, image data signals and/or input control signals may be transferred to the display module 11. The display module 11 may process the provided signals and output image information on a display screen.

The power module 14 may include a power supply module, such as a power adapter or a battery device, and a power conversion module. The power conversion module converts power supplied by the power supply module and generates power to operate the electronic device 10.

At least one of the above-described components of the electronic device 10 may be included in the display device according to embodiments as described above. In addition, in terms of functionality, some of the individual modules included in one module may be included in the display device and others may be provided separately from the display device. For example, the display module 11 is included in the display device, whereas the processor 12, the memory 13, and the power module 14 are not included in the display device and are instead provided separately in the electronic device 10.

Figure 11:
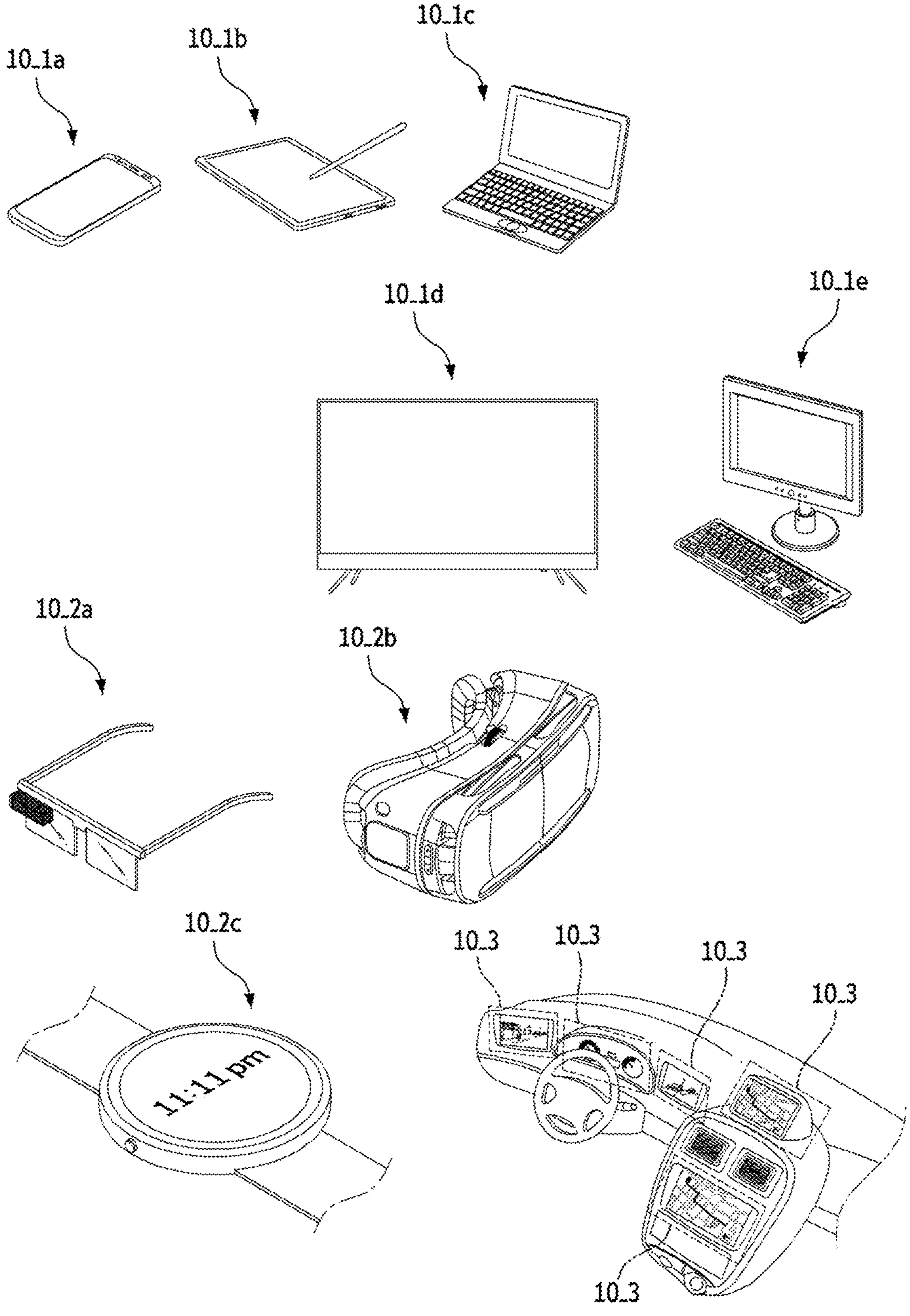
FIG. 11 shows schematic views of various embodiments of an electronic device.

FIG. 11 shows schematic views of various embodiments of an electronic device.

Referring to FIG. 11, various types of electronic devices to which embodiments of a display device are applied may include an electronic device to display images such as a smartphone 10_1*a*, a tablet PC 10_1*b*, a laptop computer 10_1*c*, a television (TV) 10_1*d*, and a desktop monitor 10_1*e*, a wearable electronic device including a display module such as smart glasses 10_2*a*, a head-mounted display (HMD) 10_2*b*, and a smart watch 10_2*c*, and an automotive electronic device 10_3 including a display module such as a center information display (CID) disposed at the instrument cluster, the center fascia, and the dashboard of a vehicle, and a room mirror display.

The technical concept of the present disclosure has been specifically described through the above embodiments; however, it should be noted that these embodiments are provided for illustrative purposes only and do not limit the scope of the present disclosure. Additionally, those skilled in the art will understand that various changes in form and details may be made without departing from the scope of the present disclosure.

What is claimed is:

1. A pixel comprising:

a fifth transistor that is connected between a first power voltage and a fourth node, and includes a gate electrode connected to a first emission control line;

a first transistor that is connected between the first power voltage and a second node, and includes a first gate electrode connected to a first node;

a second transistor that is connected between a data line and the first node, and includes a gate electrode connected to a second scan line;

a sixth transistor that is connected between the second node and a third node, and includes a gate electrode connected to a second emission control line;

a first capacitor connected between the first node and the second node; and a light emitting element connected between the third node and a second power voltage, wherein when the pixel enters a non-emission period, the sixth transistor is turned off after the fifth transistor is turned off, and when the pixel enters an emission period, the sixth transistor is turned on after the fifth transistor is turned on.

2. The pixel of claim 1, further comprising:

a third transistor that is connected between a reference voltage and the first node, and includes a gate electrode connected to a third scan line;

a fourth transistor that is connected between the second node and a first initialization voltage, and includes a gate electrode connected to a first scan line;

a seventh transistor that is connected between the third node and a second initialization voltage, and includes a gate electrode connected to a fourth scan line; and a second capacitor connected between the reference voltage and the second node, wherein a second gate electrode of the first transistor is connected to the second node.

3. The pixel of claim 2, wherein the first to seventh transistors are N-type transistors.

4. The pixel of claim 2, wherein after the sixth transistor is turned off, a data writing operation using the first capacitor is performed, and after the data writing operation, the fourth transistor is turned on and the first initialization voltage is applied to the second node.

5. The pixel of claim 4, wherein after the first initialization voltage is applied to the second node, the fourth transistor is turned off, and the fifth transistor is turned on, then the seventh transistor is turned off, and then the sixth transistor is turned on to enter the emission period.

6. The pixel of claim 2, wherein when a driving time of a panel driving frame is a reference driving time, one display scan operation is performed, and when the driving time of the panel driving frame is not the reference driving time, one display scan operation and at least one or more self-scan operations are performed;

during the display scan operation, after the sixth transistor is turned off, the fourth and seventh transistors are turned on and an initialization operation is performed;

the third and fifth transistors are turned on and a threshold voltage compensation operation for the first transistor is performed;

the second transistor is turned on and a writing operation using the first capacitor is performed; and after the writing operation is performed, the fourth transistor is turned on and the first initialization voltage is applied to the second node.

7. The pixel of claim 6, wherein after the first initialization voltage is applied to the second node, the fifth transistor is turned on, then the seventh transistor is turned off, and then the sixth transistor is turned on to enter the emission period.

8. The pixel of claim 2, wherein when a driving time of a panel driving frame is a reference driving time, one display scan operation is performed, and when the driving time of the panel driving frame is not the reference driving time, one display scan operation and at least one or more self-scan operations are performed;

during the self-scan operation, after the sixth transistor is turned off, the second transistor is turned on and a writing operation using the first capacitor is performed; and after the writing operation is performed, the fourth transistor is turned on and the first initialization voltage is applied to the second node.

9. The pixel of claim 8, wherein after the first initialization voltage is applied to the second node, the fifth transistor is turned on, then the seventh transistor is turned off, and then the sixth transistor is turned on to enter the emission period.

10. A display device comprising:

a pixel that is connected to a data line, a plurality of emission control lines, and a plurality of scan lines;

an emission driver that supplies at least one emission control signal to the plurality of emission control lines;

a scan driver that supplies at least one initialization signal, a write signal, and a reset signal to the plurality of scan lines;

a data driver that supplies a data voltage to the data line; and a power voltage generator that supplies a first power voltage, a second power voltage, a reference voltage, a first initialization voltage, and a second initialization voltage to the pixel, wherein the pixel includes:

a fifth transistor that is connected between a first power voltage and a fourth node, and includes a gate electrode connected to a first emission control line;

a first transistor that is connected between the first power voltage and a second node, and includes a first gate electrode connected to a first node;

a second transistor that is connected between the data line and the first node, and includes a gate electrode connected to a second scan line;

a sixth transistor that is connected between the second node and a third node, and includes a gate electrode connected to a second emission control line;

a first capacitor connected between the first node and the second node; and a light emitting element connected between the third node and a second power voltage, and when the pixel enters a non-emission period, the sixth transistor is turned off after the fifth transistor is turned off, and when the pixel enters an emission period, the sixth transistor is turned on after the fifth transistor is turned on.

11. The display device of claim 10, wherein the pixel further includes:

a third transistor that is connected between a reference voltage and the first node, and includes a gate electrode connected to a third scan line;

a fourth transistor that is connected between the second node and a first initialization voltage, and includes a gate electrode connected to a first scan line;

a seventh transistor that is connected between the third node and a second initialization voltage, and includes a gate electrode connected to a fourth scan line; and a second capacitor connected between the reference voltage and the second node, and a second gate electrode of the first transistor is connected to the second node.

12. The display device of claim 11, wherein the first to seventh transistors are N-type transistors.

13. The display device of claim 11, wherein after the sixth transistor is turned off, a data writing operation using the first capacitor is performed, and after the data writing operation, the fourth transistor is turned on and the first initialization voltage is applied to the second node.

14. The display device of claim 13, wherein after the first initialization voltage is applied to the second node, the fourth transistor is turned off, and the fifth transistor is turned on, then the seventh transistor is turned off, and then the sixth transistor is turned on to enter the emission period.

15. The display device of claim 11, wherein when a driving time of a panel driving frame is a reference driving time, one display scan operation is performed, and when the driving time of the panel driving frame is not the reference driving time, one display scan operation and at least one or more self-scan operations are performed;

during the display scan operation, after the sixth transistor is turned off, the fourth and seventh transistors are turned on and an initialization operation of the pixel is performed;

the third and fifth transistors are turned on and a threshold voltage compensation operation for the first transistor is performed;

the second transistor is turned on and a writing operation using the first capacitor is performed; and after the writing operation is performed, the fourth transistor is turned on and the first initialization voltage is applied to the second node.

16. The display device of claim 15, wherein after the first initialization voltage is applied to the second node, the fifth transistor is turned on, then the seventh transistor is turned off, and then the sixth transistor is turned on to enter the emission period.

17. The display device of claim 11, wherein when a driving time of a panel driving frame is a reference driving time, one display scan operation is performed, and when the driving time of the panel driving frame is not the reference driving time, one display scan operation and at least one or more self-scan operations are performed;

during the self-scan operation, after the sixth transistor is turned off, the second transistor is turned on and a writing operation using the first capacitor is performed; and after the writing operation is performed, the fourth transistor is turned on and the first initialization voltage is applied to the second node.

18. The display device of claim 17, wherein after the first initialization voltage is applied to the second node, the fifth transistor is turned on, then the seventh transistor is turned off, and then the sixth transistor is turned on to enter the emission period.

19. An electronic device, comprising:

a processor to provide input image data; and a display device to display an image based on the input image data, wherein the display device comprises:

a pixel that is connected to a data line, a plurality of emission control lines, and a plurality of scan lines;

an emission driver that supplies at least one emission control signal to the plurality of emission control lines;

a scan driver that supplies at least one initialization signal, a write signal, and a reset signal to the plurality of scan lines;

a data driver that supplies a data voltage to the data line; and a power voltage generator that supplies a first power voltage, a second power voltage, a reference voltage, a first initialization voltage, and a second initialization voltage to the pixel, wherein the pixel includes:

a fifth transistor that is connected between a first power voltage and a fourth node, and includes a gate electrode connected to a first emission control line;

a first transistor that is connected between the first power voltage and a second node, and includes a first gate electrode connected to a first node;

a second transistor that is connected between the data line and the first node, and includes a gate electrode connected to a second scan line;

a sixth transistor that is connected between the second node and a third node, and includes a gate electrode connected to a second emission control line;

a first capacitor connected between the first node and the second node; and a light emitting element connected between the third node and a second power voltage, and when the pixel enters a non-emission period, the sixth transistor is turned off after the fifth transistor is turned off, and when the pixel enters an emission period, the sixth transistor is turned on after the fifth transistor is turned on.

* * * * *